US012006916B2

United States Patent
Hovgaard et al.

(10) Patent No.: US 12,006,916 B2
(45) Date of Patent: Jun. 11, 2024

(54) CONTROLLING FLAP LOADING ON A WIND TURBINE BLADE BASED ON PREDICTED FLAP LOADING

(71) Applicant: VESTAS WIND SYSTEMS A/S, Aarhus (DK)

(72) Inventors: Tobias Gybel Hovgaard, Ry (DK); Kasper Zinck, Flemming (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 483 days.

(21) Appl. No.: 16/888,982

(22) Filed: Jun. 1, 2020

(65) Prior Publication Data
US 2020/0378361 A1 Dec. 3, 2020

(30) Foreign Application Priority Data
May 31, 2019 (EP) .................................... 19177617

(51) Int. Cl.
| | |
|---|---|
| *F03D 7/04* | (2006.01) |
| *F03D 1/06* | (2006.01) |
| *F03D 7/02* | (2006.01) |
| *F03D 13/10* | (2016.01) |

(Continued)

(52) U.S. Cl.
CPC .............. *F03D 7/045* (2013.01); *F03D 1/06* (2013.01); *F03D 7/02* (2013.01); *F03D 7/0224* (2013.01); *F03D 7/0256* (2013.01); *F03D 7/0296* (2013.01); *F03D 13/10* (2016.05); *F03D 13/35* (2016.05); *F03D 17/00* (2016.05);

(Continued)

(58) Field of Classification Search
CPC .... F03D 7/045; F03D 17/00; F05B 2270/332; F05B 2270/404
See application file for complete search history.

(56) References Cited

U.S. PATENT DOCUMENTS

| | | | |
|---|---|---|---|
| 2018/0340515 A1 | 11/2018 | Huyn et al. | |
| 2020/0378361 A1* | 12/2020 | Hovgaard | ................. F03D 7/02 |

FOREIGN PATENT DOCUMENTS

| | | |
|---|---|---|
| EP | 3436693 A1 | 2/2019 |
| WO | 2013044925 A1 | 4/2013 |
| WO | 2015051801 A1 | 4/2015 |

(Continued)

OTHER PUBLICATIONS

European Patent Office Extended European Search Report for Application No. 19177617.8-1007 dated Nov. 11, 2019.

*Primary Examiner* — Christopher R Legendre
(74) *Attorney, Agent, or Firm* — Patterson + Sheridan, LLP (57) ABSTRACT

Techniques for controlling loading on a wind turbine blade in the flap-wise direction. A system model has a description of flap loading on the blade and is used to predict flap loading on the blade over a prediction horizon using the system model. A dynamic flap loading limit is determined based on predicted flap loading and a measured flap loading, and a constraint is defined to limit flap loading on the blade based on the dynamic flap loading limit. The predicted flap loading is used in a cost or performance function, and the cost function is optimized subject to the constraint to determine pitch for the blade to control flap loading on the blade. Advantageously, the dynamic limit varies based on discrepancies between predicted and measured flap loading to allow for adaptive back-off from extreme loads prior to such loads building up or being exceeded.

13 Claims, 4 Drawing Sheets

(51) Int. Cl.
  *F03D 13/35* (2016.01)
  *F03D 17/00* (2016.01)
(52) U.S. Cl.
  CPC . *F05B 2240/3052* (2020.08); *F05B 2270/332* (2013.01); *F05B 2270/404* (2013.01)

(56) References Cited

FOREIGN PATENT DOCUMENTS

| WO | 2017167343 A1 | 10/2017 |
| WO | 2018184645 A1 | 10/2018 |

* cited by examiner

CONTROLLING FLAP LOADING ON A WIND TURBINE BLADE BASED ON PREDICTED FLAP LOADING

FIELD OF THE INVENTION

The present invention generally relates to controlling flap loading on a wind turbine blade based on predicted flap loading.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g. wind shear or turbulence, or may be caused by changing operation of the wind turbine, e.g. grid loss.

The blades of a wind turbine experience flap-wise blade root fatigue and extreme loads, i.e. loading in the flap-wise direction of the blades. Such flap loading is predominantly caused by aerodynamic loads. Excessive flap loading can reduce the lifespan of a wind turbine blade or even cause failure of the blade.

It is known to control pitch of a wind turbine blade in order to alleviate flap loading. In one known method, a standard deviation of measured flap loads on a wind turbine blade is determined, and the wind turbine is controlled to schedule a back off on thrust force in dependence on the standard deviation. In particular, thrust force is related to flap-wise blade root fatigue loads, and thrust force is controlled by pitching the blades. Specifically, flap loading may be alleviated by pitching out the blades.

In such a method, the absolute flap loading on the blade is not being considered and, as such, the wind turbine may be controlled to back off on thrust force, i.e. pitch out, even when the flap loading is not at a maximum design loading of the blade. This results in an unnecessary loss in power generation.

Furthermore, it is noted that even if a wind turbine was controlled based on absolute measured flap loading relative to a maximum design loading then it would not be possible to allow the measured flap loading to approach the maximum because: there are uncertainties in the measured values; and, the blades cannot be pitched out quickly enough to effectively limit the flap loading if the reaction is only activated once a critical blade load starts building up.

It is against this background to which the present invention is set.

SUMMARY OF THE INVENTION

According to an aspect of the present invention there is provided a method of controlling flap loading on a wind turbine blade. The method may comprise defining a system model comprising a description of flap loading on the blade. The method may comprise predicting flap loading on the blade over a prediction horizon using the system model. The method may comprise determining a dynamic flap loading limit based on predicted flap loading and a measured flap loading, and defining a constraint to limit flap loading on the blade based on the dynamic flap loading limit. In particular, the constraint may be defined such that flap loading on the blade is less than or equal to the dynamic flap loading limit. The method may comprise using the predicted flap loading in a cost function, and optimising the cost function subject to the constraint to determine at least one control output to control flap loading on the blade.

The dynamic flap loading limit may be an adjustment to a maximum design limit of the blade.

The adjustment may include a term dependent on the difference between the measured and predicted flap loading.

The difference between the measured and predicted flap loading may be scaled in the adjustment by a decaying function of time.

The adjustment may include a term dependent on a rate of change of the difference between the measured and predicted flap loading.

In some embodiments, determining the adjustment comprises application of a low-pass filter.

The constraint may be a slack constraint defining that flap loading on the blade is less than or equal to a sum of the dynamic flap loading limit and a non-negative slack variable. Optimising the cost function may comprise determining a value of the slack variable.

The slack variable may be penalised in the cost function by a penalty parameter.

The measured flap loading may be based on sensor output data received from one or more flap loading sensors of the blade.

The sensor output data may be received from a plurality of flap loading sensors. The measured flap loading may be determined to be a maximum value of the received sensor output data.

The system model may describe flap loading on the blade as a function of thrust force. In some embodiments, predicting flap loading on the blade comprises predicting thrust force over the prediction horizon.

The at least one control output may comprise controlling pitch of the blade.

The system model description of flap loading on the blade may comprise a quasi-static function describing bending moment of the blade.

According to another aspect of the present invention there is provided a non-transitory, computer-readable storage medium storing instructions thereon that when executed by a processor causes the processor to perform the method described above.

According to another aspect of the invention there is provided a controller for controlling flap loading on a wind turbine blade. The controller may be configured to define a system model comprising a description of flap loading on the blade. The controller may be configured to predict flap loading on the blade over a prediction horizon using the system model. The controller may be configured to determine a dynamic flap loading limit based on predicted flap loading and a measured flap loading, and define a constraint to limit flap loading on the blade based on the dynamic flap loading limit. In particular, the constraint may be defined such that flap loading on the blade is less than or equal to the dynamic flap loading limit. The controller may be configured to use the predicted flap loading in a cost function, and optimise the cost function subject to the constraint to determine at least one control output to control flap loading on the blade.

According to another aspect of the present invention there is provided a wind turbine comprising a controller as described above.

BRIEF DESCRIPTION OF THE DRAWINGS

One or more embodiments of the invention will now be described by way of example with reference to the accompanying drawings, in which.

DETAILED DESCRIPTION

Figure 1:
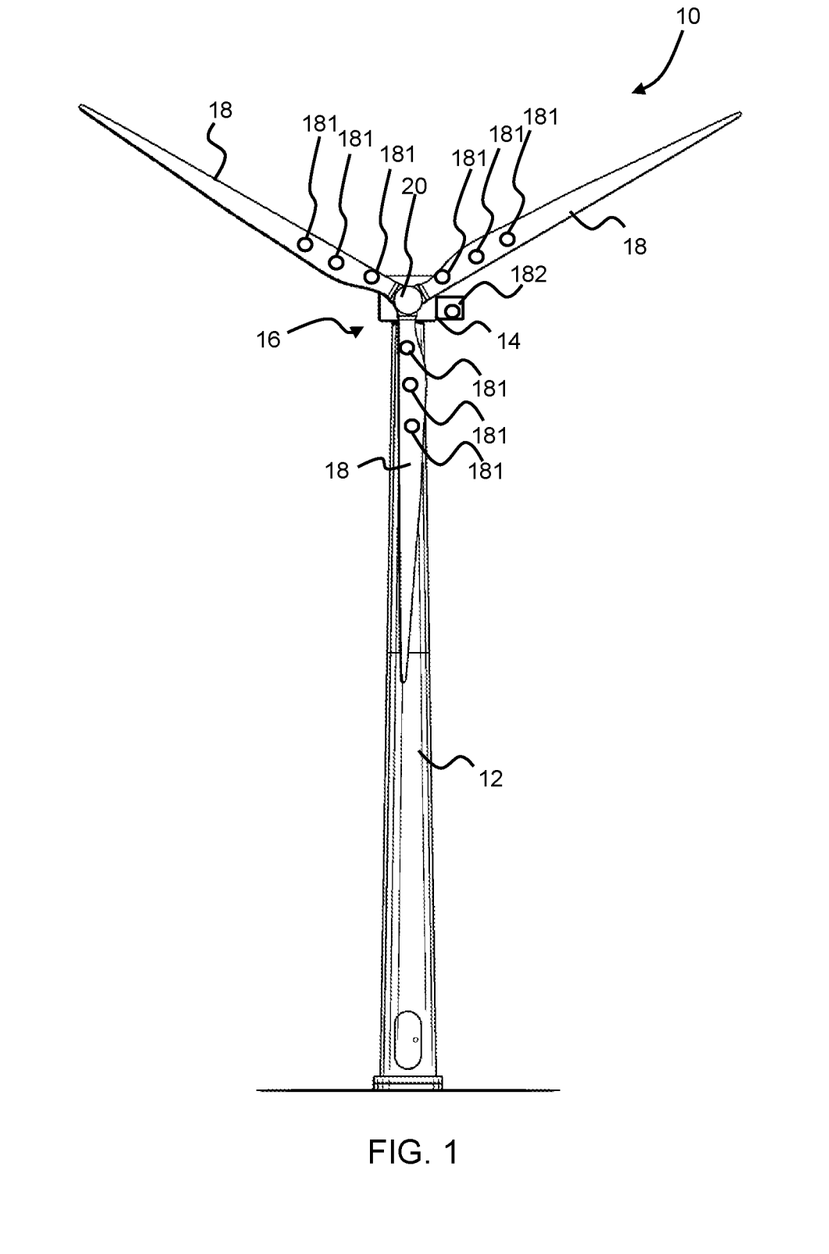
FIG. 1 is a schematic diagram of a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible.

Shown within each blade 18 are a number of blade load sensors 181, in particular three sensors 181 in each of the three blades 18 in the present example. Any suitable number of blade load sensors may be used. The blade load sensors 181 are arranged to measure flap loading on the blades 18. The sensing element may be a fibre optic strain gauge, a resistive strain gauge, or any other appropriate detector. A rotor wind speed detector 182 is also shown—again, this measurement may be performed in several ways as the skilled person will appreciate, one being through LIDAR as the skilled person will appreciate from the literature of wind turbine design and control.

Figure 2:
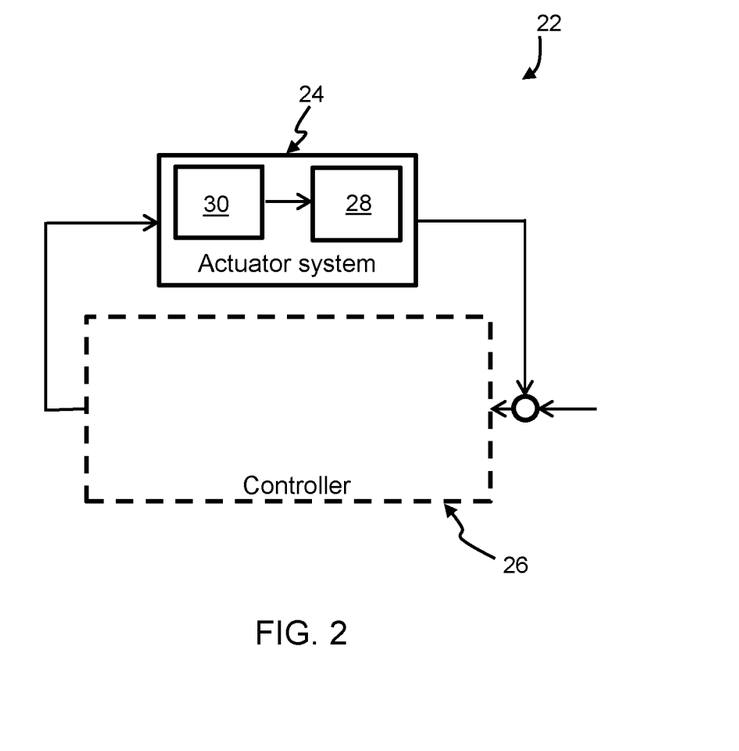
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a control unit or controller 26. In this particular example, the actuator system 24 may be, or may comprise, a pitch system for controlling pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28. The controller 26 and actuator system 24 may be replicated for each of the blades 18 of the wind turbine 10 so that the position of each blade 18 may be controlled independently.

The pitch system of the wind turbine 10 is just one example of a wind turbine system that may be controlled. The controller 26 may also be used to control other wind turbine systems and/or components. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system or component that requires high speed real time control.

In one example method of the invention, the pitch of individual blades 18 in the wind turbine 10 may be controlled to alleviate loading in the flap-wise direction of the blades 18. In particular, a description of loading in the flap-wise direction, i.e. flap loading, is included in a system model describing dynamics of the wind turbine 10, and the system model is optimised subject to one or more constraints to determine one or more control outputs, e.g. pitch control, to control the wind turbine 10. Specifically, a dynamic limit on allowable levels of flap loading on the blades 18 is determined as part of the optimisation algorithm, with the wind turbine 10 being controlled to operate in accordance with the determined dynamic flap loading limit. This is described in greater detail below.

Figure 3:
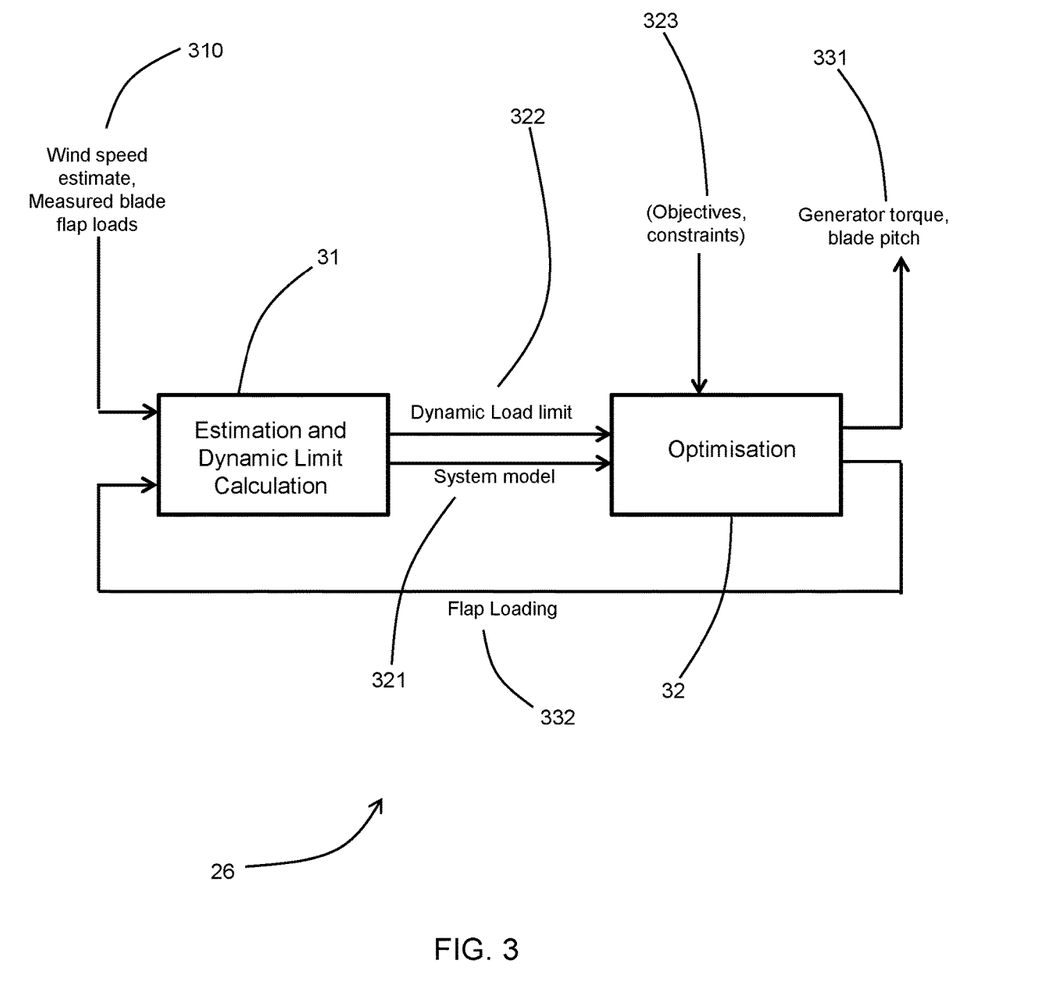
FIG. 3 shows component parts of the controller of FIG. 2, in particular an estimator unit and a model predictive control unit according to an example of the invention; and, FIG. 4 summaries the method steps executed by the controller of FIG. 2 according to an example of the invention.

A specific example implementing this approach in the controller 26 is shown schematically in FIG. 3. Two functional elements are shown—an estimation and dynamic limit calculation unit 31 (or, simply, an estimator unit 31) and a model predictive control unit or optimisation unit 32. Both of these units may be provided by suitable software running on any suitable computing substrate using conventional or customer processors and memory. The estimator unit 31 and the optimisation unit 32 may use a common computing substrate (for example, they may run on the same server) or separate substrates, or one or both may themselves be distributed between multiple computing devices.

In the described example, the estimator unit 31 receives as inputs a wind speed estimate and the measured flap loads 310 on the blades 18 from the blade load sensors 181. A loading on the blades 18 in the flap-wise direction 332 derived as an output from the optimisation unit 32 as a predicted trajectory over the prediction horizon is also fed back to the estimator unit 31. The outputs from the estimator unit 31 are the system model 321 including the description of blade flap loading and over a prediction horizon together with the determined dynamic flap load limit 322, as discussed below. The outputs from the estimator unit 31 are fed into the optimisation unit 32 as inputs. The optimisation unit 32 provides generator torque and blade pitch control 331 for the wind turbine according to an optimisation result determined subject to a number of objectives and constraints 323.

The dynamic flap load limit is now described in more detail. In the optimisation problem, a constraint is added that limits the allowable flap loading that may be experienced by the blades 18 before an increased possibility of fatigue or failure sets in. In the described example, the optimisation problem includes the constraint $$\kappa \cdot \hat{F}_t \leq \text{FlapLoadLimit} + \xi_{flap}$$

where FlapLoadLimit is the dynamic flap load limit that is to be determined as part of the optimisation problem. K is a turbine-dependent constant that relates a thrust force on the rotor 20 to a flap-wise blade root bending moment. This may be regarded as a measure of the effective length of the blades 18. $\xi_{flap} \geq 0$ is a slack variable that is also determined as part of the optimisation problem. By 'slack variable' is generally meant a variable that is added to an inequality constraint in an optimisation problem to maintain the feasibility of the optimisation problem. This may be regarded as ensuring that a solution to the optimisation problem that satisfies the constraint may always be found irrespective of inputs. The constraint in this instance may be referred to as a soft constraint. The above constraint may be regarded as being the quasi-static bending moment of the blades 18 being limited by a temporally-dependent maximum threshold blade flap loading (plus some slack, if needed).

As mentioned above, the slack variable $\xi_{flap}$ acts to ensure that the optimisation problem is always feasible. For example, if the measured or estimated bending moment at a particular instant is greater than the limit that it is desired to impose, then adding the slack variable to the inequality ensures that the optimiser 32 can still find a solution instead of returning an error. In particular, the addition of the slack variable allows for (temporary) violation of the inequality constraint; however, such violations are penalised by minimising the slack variable in the cost function to be optimised. In the described example, this is achieved in the cost function by adding the term $$\eta_{flap}/\xi_{flap}$$

where $\eta_{flap}$ is a penalty parameter or tuning parameter. $\eta_{flap}$ can be tuned as desired; for example, a lower penalty on the slack variable allows for a greater violation of the above inequality or constraint for a short time, whereas a larger penalty on the slack variable causes a more rapid reaction in the control of the wind turbine 10 when the constraint is, or is close to being, violated.

The dynamic flap load limit FlapLoadLimit to be used in the above constraint is itself calculated in the estimation unit 31. In particular, the flap load limit is dynamic, i.e. time-dependent, to address the issue that preventative actions that are available in order to guard against extreme flap loads on the blades, e.g. pitching the blades 18 out of the wind to relieve some thrust force, often cannot be implemented quickly enough. This is because effective flap load limiting is often not possible if the reaction is only activated or implemented once an extreme or critical load is exceeded or starts building up. For example, this would be equivalent to the parameter FlapLoadLimit being equal to the actual or maximum design load in the flap-wise direction of the blades 18. As such, an adaptive back-off from the design load is built in to the parameter FlapLoadLimit.

In the described example, the parameter FlapLoadLimit is defined as $$FlapLoadLimit=LP(FlapLoad_{max}-BladeLoadMarginGain*m*z(t)-BladeLoadMarginDiffGain*dm/dt)$$

$FlapLoad_{max}$ is a maximum design limit of the blades 18, i.e. a parameter set to the blade root design load. BladeLoadMarginGain and BladeLoadMarginDiffGain are tuning parameters for added safety. LP is the application of a low-pass filter to the produced signal which, in the described example, is 0.5 seconds; however, any suitable filter may be used. m is a margin that is determined based on the measured flap loads from the sensors 181 and a predicted flap load from the optimization unit 32, and dm/dt is the rate of change of this margin. z(t) is a decaying function of time to include some memory into the dynamic limit. A method of determining m, dm/dt and z(t) is outlined below.

As indicated in FIG. 3, the predicted collective flap loading as determined in the optimisation module 32, i.e. by the model predictive control (MPC) algorithm, is input into the estimation unit 31 and referred to as MPC_FlapLoad. Also as indicated in FIG. 3, the flap loading as measured by the blade load sensors 181 is input to the estimation unit 181. In the described example, there are three load sensors 181 on each blade 18 and the maximum of the three received sensor values is used in the determination of the dynamic flap load limit and referred to as MaxMeasuredFlapLoad. In other examples, the measured flap loading may be determined in a different manner based on the received data from the flap loading sensors 181, e.g. an average value.

Initially, i.e. at t=0, m=0 and z=0. If $$MaxMeasuredFlapLoad-MPC\_FlapLoad \geq m*z(t)$$

then $$m=\min(FlapLoad_{max}, (MaxMeasuredFlapLoad-MPC\_FlapLoad))$$

$$t=1$$

else t is set to be equal to $t+T_s$, where $T_s$ is the sampling time, and m is maintained at its previous value.

After this determination z is updated according to $$z(t)=\exp(-t/k)/\exp(-1/k)$$

This process is then repeated as a loop with the updated values of the parameters and measured or estimated parameters.

It is seen that z(t) is an exponentially-decaying function that equals one at t=1. The factors of k in the decaying function are so-called 'forgetting' factors that may be chosen to be any suitable value.

The above calculations may be expressed in words as meaning that, at each time sample, if the positive difference between the current maximum of the measured flap loads and the current collective flap load predicted by the MPC algorithm is greater than the previous maximum difference between these two values scaled by the decaying function z(t), then t is initialised to one and the margin m is set to be the current difference between the measured and predicted flap loads. However, if the positive difference between the current measured and predicted flap loads does not exceed the previous difference, then t is increased by the sampling time $T_s$. As the value of t increases, it becomes more likely that the positive difference between the current measured and predicted flap loads will be greater than m*z(t) (as z(t)→0 as t→∞), which in turn means that it is more likely that the current difference becomes the new or updated value of the margin m. Using the determined values of m, z, and, in turn, dm/dt, the dynamic flap load limit FlapLoadLimit is calculated as defined above. The dynamic flap load limit FlapLoadLimit may furthermore be limited from below by a minimum flap load parameter MinFlapLimit.

It is seen above that the dynamic flap loading limit may be regarded as an adjustment to the maximum design limit $FlapLoad_{max}$ of the blades 18. In particular, the adjustment includes a term dependent on the difference between the measured and predicted flap loading, i.e. dependent on m=MaxMeasuredFlapLoad−MPC_FlapLoad. In the described embodiment, the term including the difference between the measured and predicted flap loading is scaled in the adjustment by the decaying function of time z(t). Furthermore, the adjustment also includes a term dependent on a rate of change of the difference between the measured and predicted flap loading, i.e. dm/dt.

Figure 4:
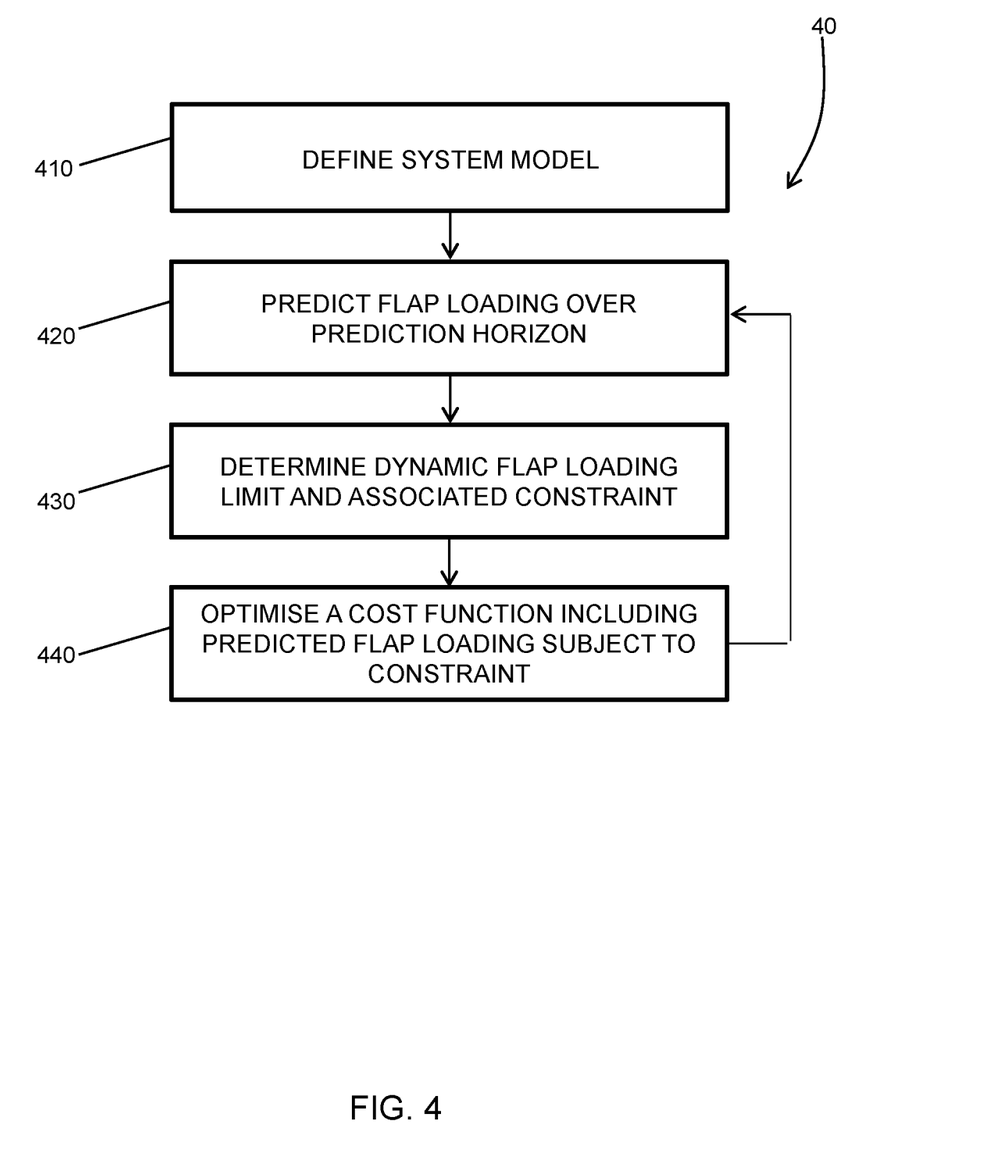

FIG. 4 outlines the steps of a method 40 performed by the controller 26 to maintain or maximize power output of the wind turbine 10 while alleviating flap loading on the blades 18. At step 410 the system model describing dynamics of one or more components of the wind turbine 10 is defined. In particular, the system model includes a description of flap loading on one or more of the blades 18. The system model may include dynamics such as tower vibrations, tilt and/or yaw loading, and tower clearance control, as well as generated power output of the turbine 10.

At step 420, the controller 26 uses the defined system model to predict trajectories of one or more variables of the model over a prediction horizon based on received input values for each of a finite number of time steps from a current time step. In particular, the input values include the measured flap loads and a wind speed estimate 310 and also predicted flap loading 332 from a previous solve of the optimisation problem. Specifically, flap loading on one or more of the blades 18 is predicted over the prediction horizon in the estimation unit 31 for an optimal trajectory over time. In the described example, the system model describes flap loading on the blades 18 as a function of thrust force. The thrust force is determined from the received wind speed estimate and the thrust force is predicted over the prediction horizon. The predicted flap loading on the blades 18 over the prediction horizon is then determined from the predicted thrust force on the wind turbine 10 over the prediction horizon.

At step 430, the controller 26 determines the dynamic flap loading limit based on predicted flap loading 332 and measured flap loading 310 in the estimation unit 31 as described above. Note that as the dynamic limit is based on predicted blade loading then the dynamic limit is also a predicted dynamic limit in the estimation unit 31 along a number of possible trajectories over the prediction horizon that needs to be optimised as part of the solution to the optimisation problem. The predicted system model 321 and predicted dynamic flap load limit 322 are input into the optimisation unit 32. The optimisation unit also receives the various objectives and constraints on which the optimisation is to be based. In particular, the controller 26 defines a constraint to limit flap loading on the blade 18 based on the dynamic flap loading limit. Specifically, the constraint is the inequality described above in which the quasi-static blade bending moment is limited to the determined dynamic flap loading limit. In practice, the quasi-static blade bending moment is constrained to be less than or equal to the determined dynamic flap loading limit plus some slack. Including a description of blade flap loading in a system model could add complexity to the system model which makes it difficult to be processed by an MPC algorithm. Often, MPC algorithms perform convex optimisations and can be computationally expensive. A quasi-static model for blade loading allows for inclusion of flap-wise loading dynamics in the system model without adding complexity that could render the MPC algorithm computationally infeasible. The model is in particular a function of system operating point and control actions.

At step 440, the optimisation problem is solved in the optimisation unit 32 using the system model and subject to the objectives and constraints, predicted or otherwise. In particular, the predicted system behaviour, including the predicted flap loading, is used in a cost function, which is then optimised subject to the constraints, including the dynamic flap load limit constraint, to determine at least one control output 331 to control flap loading on one or more of the blades 18. In particular, the blade pitch may be controlled to relieve some thrust force by pitching the blades 18 out of the wind if back-off from the dynamic flap loading limit is needed. Specifically, the optimisation problem is solved according to an MPC algorithm to determine the optimal trajectories for each of the system variables and control outputs over the prediction horizon for controlling the wind turbine to operate according to the optimal trajectories are determined. Typically, in an MPC approach only the control outputs corresponding to the first time step along the prediction horizon are then implemented by the controller 26. Steps 420, 430 and 440 are then repeated to determine the control outputs to be implemented at the next time step.

Embodiments of the invention are advantageous in that by including a model of blade loading in the flap-wise direction in a predictive wind turbine control approach, a prediction of blade flap loading may be determined and used to guard against actual flap-wise loading of the blades approaching or exceeding a threshold, e.g. a design load limit of the blades, in advance of such loading occurring, specifically by implementing an adaptive back-off load limit. Such a method can therefore be used to guard against critical fatigue and extreme loads building up in the flap-wise direction.

Embodiments of the invention are advantageous in that by including a dynamic limit on blade flap loading in the predictive control algorithm, uncertainties in measured blade flap loads may be better managed, in particular discrepancies between measured and predicted flap loads. The measured loads may be averaged for robustness in dealing with wake conditions and wind fluctuations, and as such the maximum flap loads may not be captured in sensor data. A larger discrepancy between measured and predicted flap loads may therefore occur and may be accounted for in the dynamic limit by reducing the limit and encouraging back-off in thrust force to reduce loads sooner than would otherwise occur.

Embodiments of the invention are advantageous in that including a dynamic limit on blade flap loading in the predictive control algorithm allows for greater or sufficient reaction time to control the wind turbine, e.g. control blade pitch, to guard against a blade design loading limit being exceeded. In particular, by taking into account the difference between measured and predicted flap loading, and/or a rate of change of this difference, a better idea of if and when the design limit will be exceeded will be known and allow for better and earlier proactive control of the blade pitch to avoid such a case.

Many modifications may be made to the above-described embodiments without departing from the scope of the present invention as defined in the accompanying claims.

In the above described embodiment, a particular expression for determining the dynamic flap loading limit is provided in which a time-dependent adjustment from a maximum design loading of the blades is calculated, in particular where the adjustment comprises terms dependent on the difference between measured and predicted flap loading and on a rate of change of this difference. In different embodiments, the dynamic flap loading limit may be of any suitable form, e.g. the adjustment may include different and/or additional terms to the example described above.

In the above-described embodiment, an MPC-based approach is used to determine control outputs by which to control the wind turbine; however, in different embodiments, other suitable predictive control methods may be used.

In the above-described embodiment, the system model description of flap loading on the blade is a quasi-static function describing bending moment of the blades; however, in different embodiments a different description of flap loading may be used, e.g. a beam model. Indeed, any suitable dynamic model description of flap loading with a dynamic blade response may be used.

The invention claimed is:

1. A method of controlling flap loading on a wind turbine blade, the method comprising:
   measuring a first flap loading on the wind turbine blade;
   estimating a wind speed;
   determining a thrust force based on the estimated wind speed;
   determining a second flap loading on the blade over a prediction horizon based on the thrust force;
   determining a dynamic flap loading limit based on the second flap loading and the first flap loading;

defining a constraint to limit flap loading on the blade based on the dynamic flap loading limit;
optimizing a cost function comprising the second flap loading subject to the constraint to produce an optimized cost function;
determining at least one control output based on the optimized cost function; and
controlling a pitch of the blade based on the at least one control output such that flap loading on the blade remains below a flap loading threshold.

2. The method according to claim 1, wherein the dynamic flap loading limit is an adjustment to a maximum design limit of the blade.

3. The method according to claim 2, wherein the adjustment includes a term dependent on a difference between the first flap loading and the second flap loading.

4. The method according to claim 3, wherein the difference between the first flap loading and the second flap loading is scaled in the adjustment by a decaying function of time.

5. The method according to claim 2, wherein the adjustment includes a term dependent on a rate of change of a difference between the first flap loading and the second flap loading.

6. The method according to claim 2, wherein determining the adjustment comprises application of a low-pass filter.

7. The method according to claim 1, wherein the constraint is a slack constraint defining that flap loading on the blade is less than or equal to a sum of the dynamic flap loading limit and a non-negative slack variable, and wherein optimizing the cost function comprises determining a value of the slack variable.

8. The method according to claim 7, wherein the slack variable is penalized in the cost function by a penalty parameter.

9. The method according to claim 1, wherein the first flap loading is based on sensor output data received from one or more flap loading sensors of the blade.

10. The method according to claim 9, wherein the sensor output data is received from a plurality of the flap loading sensors, and wherein the first flap loading is determined to be a maximum value of the received sensor output data.

11. A controller for controlling flap loading on a wind turbine blade, the controller comprising:
an input/output interface;
a memory containing instructions; and
a processor communicatively connected to the interface and memory and programmed by the instructions to perform an operation comprising:
measuring a first flap loading on the wind turbine blade;
estimating a wind speed;
determining a thrust force based on the estimated wind speed;
determining a second flap loading on the blade over a prediction horizon based on the thrust force;
determining a dynamic flap loading limit based on the second flap loading and the first flap loading;
defining a constraint to limit the flap loading on the blade based on the dynamic flap loading limit;
optimizing a cost function comprising the second flap loading subject to the constraint to produce an optimized cost function;
determining at least one control output based on the optimized cost function; and
controlling a pitch of the blade based on the at least one control output such that flap loading on the blade remains below a flap loading threshold.

12. A wind turbine, comprising:
a tower;
a nacelle disposed on the tower;
a rotor extending from the nacelle and having a plurality of blades disposed on a distal end; and
a controller configured to perform an operation comprising:
measuring a first flap loading on a blade of the plurality of blades;
estimating a wind speed;
determining a thrust force based on the estimated wind speed;
determining a second flap loading on the blade based on the thrust force;
determining a dynamic flap loading limit based on the second flap loading and the first flap loading;
defining a constraint to limit flap loading on the blade based on the dynamic flap loading limit;
optimizing a cost function comprising the second flap loading subject to the constraint to produce an optimized cost function;
determining at least one control output based on the optimized cost function; and
controlling a pitch of the blade based on the at least one control output such that flap loading on the blade remains below a flap loading threshold.

13. The wind turbine of claim 12, wherein the constraint is a slack constraint defining that flap loading on the blade is less than or equal to a sum of the dynamic flap loading limit and a non-negative slack variable, and wherein optimizing the cost function comprises determining a value of the slack variable.

* * * * *